Dec. 10, 1968     I. L. LOPATA     3,415,429
APPARATUS AND METHOD FOR MAKING LOOPED RIBBON ORNAMENTS
Filed Jan. 5, 1967     9 Sheets-Sheet 1

INVENTOR
IRA L. LOPATA

INVENTOR
IRA L LOPATA

Ira L. Lopata
INVENTOR.

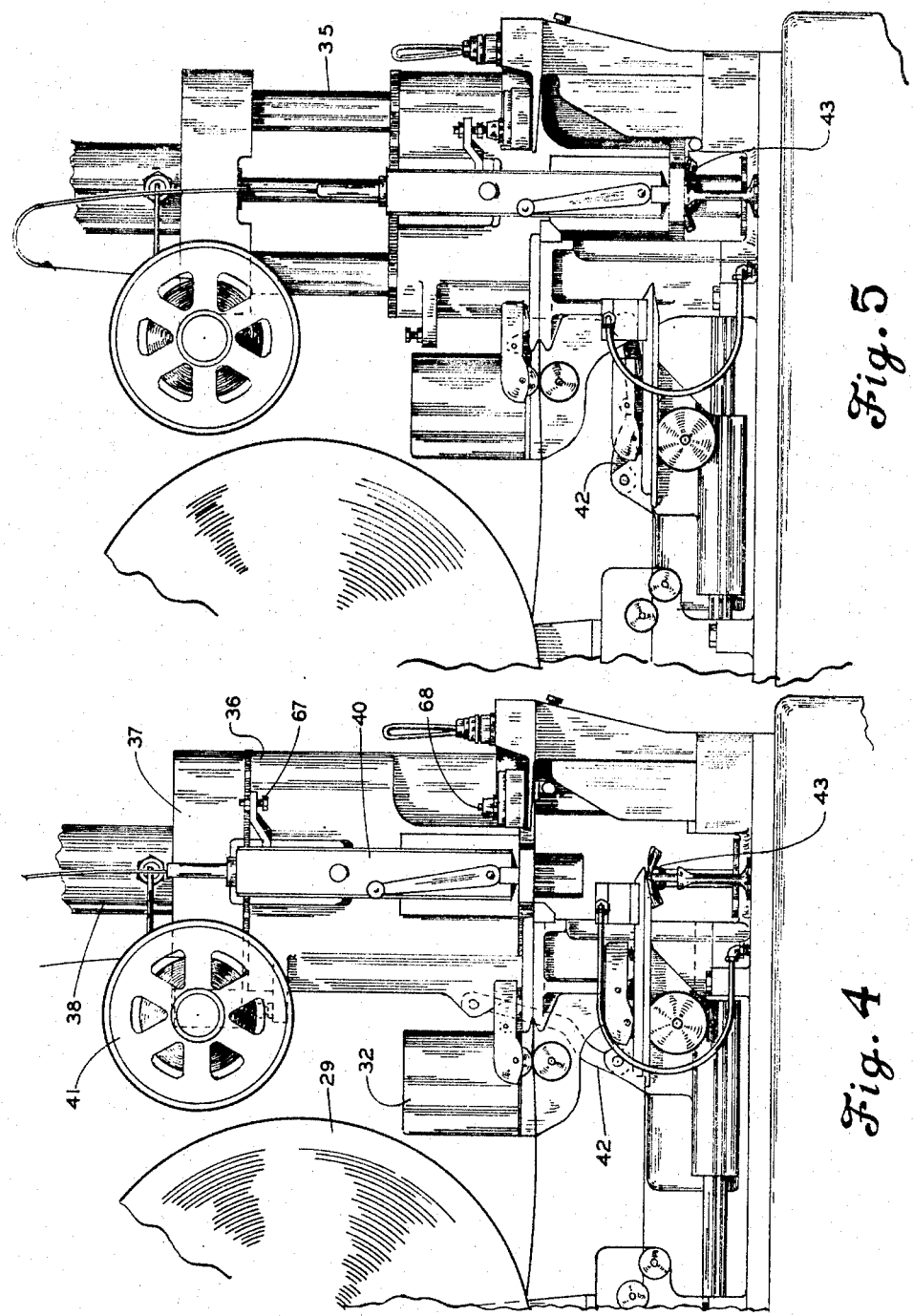

INVENTOR
IRA L. LOPATA

Dec. 10, 1968   I. L. LOPATA   3,415,429
APPARATUS AND METHOD FOR MAKING LOOPED RIBBON ORNAMENTS
Filed Jan. 5, 1967   9 Sheets-Sheet 6
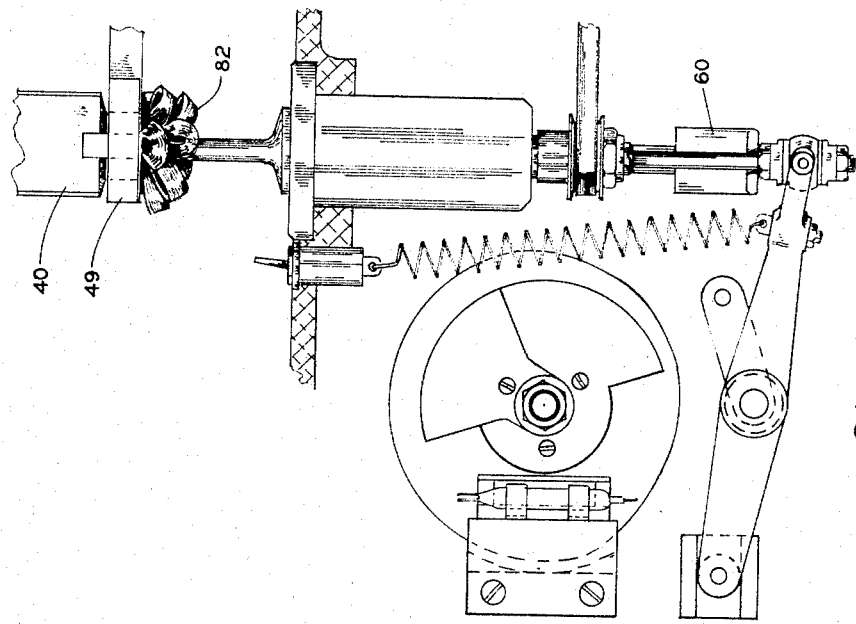
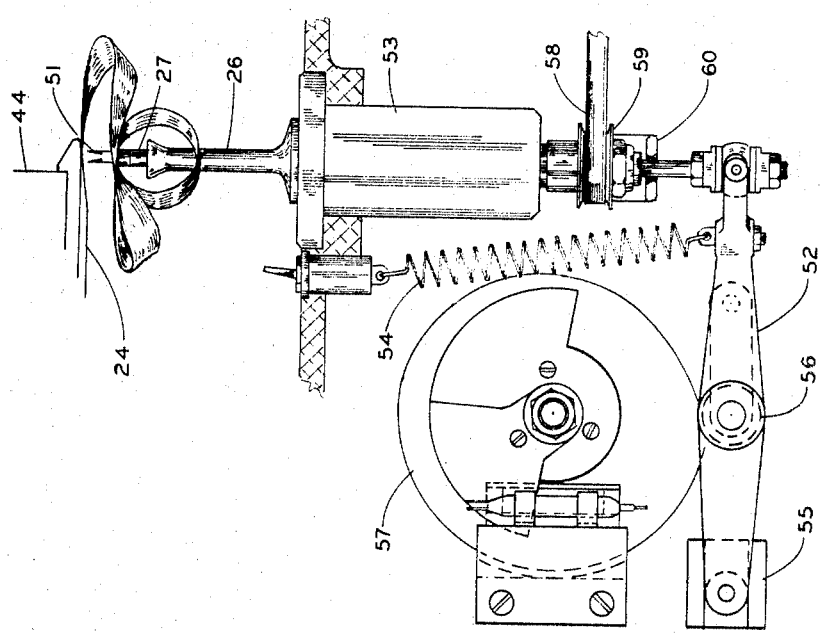
INVENTOR
IRA L. LOPATA Dec. 10, 1968   I. L. LOPATA   3,415,429
APPARATUS AND METHOD FOR MAKING LOOPED RIBBON ORNAMENTS
Filed Jan. 5, 1967   9 Sheets-Sheet 8

Ira L. Lopata
INVENTOR.

BY Popper, Bain & Bobis
Attorneys

United States Patent Office 3,415,429
Patented Dec. 10, 1968

3,415,429
APPARATUS AND METHOD FOR MAKING
LOOPED RIBBON ORNAMENTS
Ira L. Lopata, 35 Sutton Place,
New York, N.Y. 10022
Filed Jan. 5, 1967, Ser. No. 607,573
10 Claims. (Cl. 223—46)

ABSTRACT OF THE DISCLOSURE

The method for making looped ribbon ornaments in which the ribbon is delivered at a constant, uninterrupted rate to an impaling station while it is being impaled and twisted into loops; an apparatus that continuously feeds ribbon without pause, at the same time impaling and twisting it into successive loops.

Figure 1:
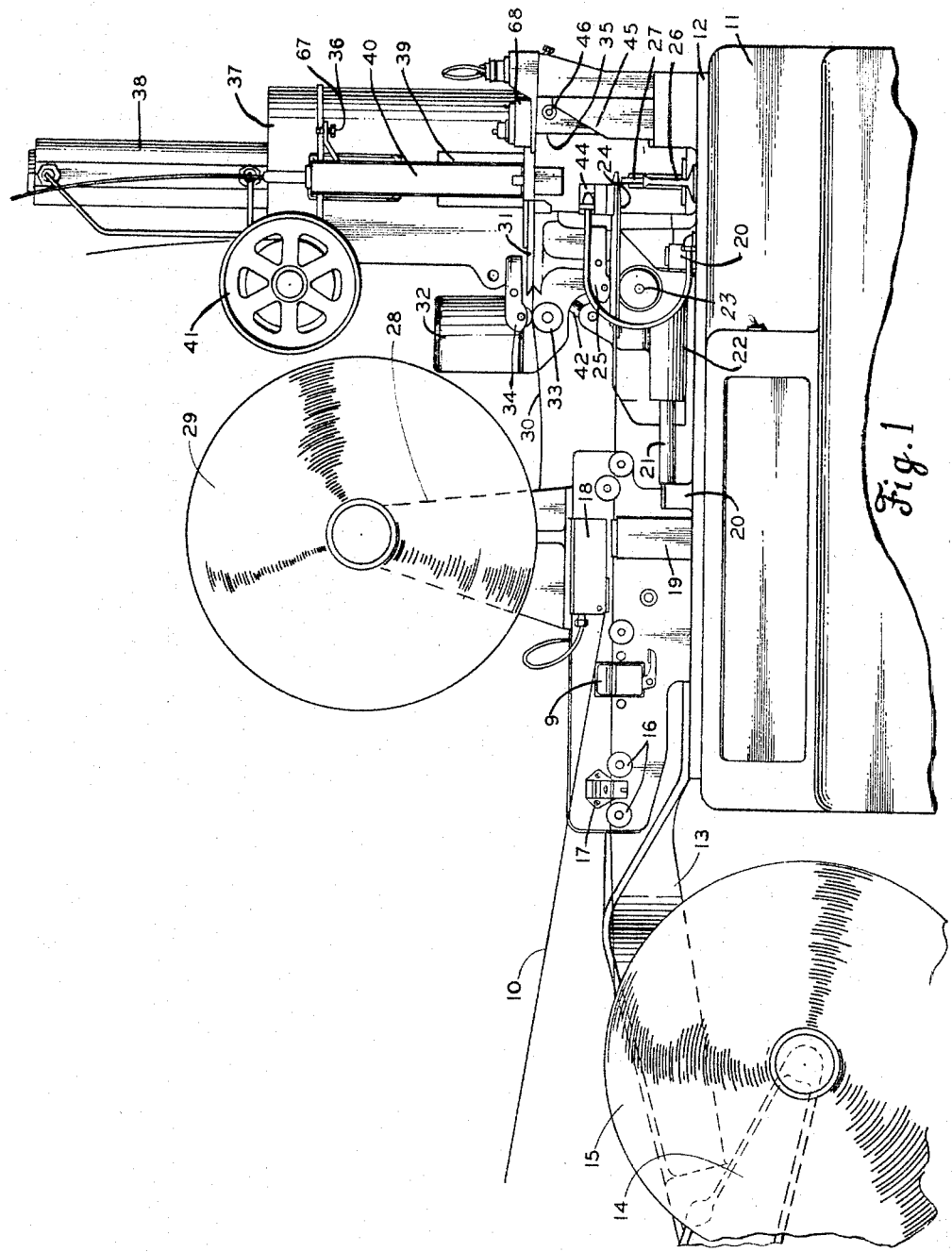

This invention relates generally to apparatus for manufacturing looped ribbon ornaments, commonly called rosettes, pompoms, or bows; more specifically, the invention relates to an apparatus of that kind in which, for the first time, the ribbon is fed continuously, without pause, to a looping station.

It is among the objects of this invention to provide an apparatus for the manufacture of looped ribbon ornaments by continuously feeding a ribbon to a looping station.

It is another object of this invention to provide a simplified looped ribbon ornament apparatus with a ribbon guide that is withdrawn only upon completion of the ornament to permit tacking it to a card or label.

Yet another object of this invention is to provide a simplified looped ribbon ornament making apparatus, eliminating the usual ribbon seizing and releasing means that intermittently feeds the ribbon to an impaling station.

Still another object of the invention is to provide a looped ribbon ornament apparatus in which the number of loops can be varied and the length of the loops can be varied, the operation can be carried on at a high rate of speed, the ornaments can be cut free from the ribbon feed, mounted on a card, and ejected into a bin.

Among the still further objects of the invention is to provide ribbon impaling action which does not impair the appearance of the ribbon ornament even though the ribbon is fed without pause or interruption.

Figure 2:
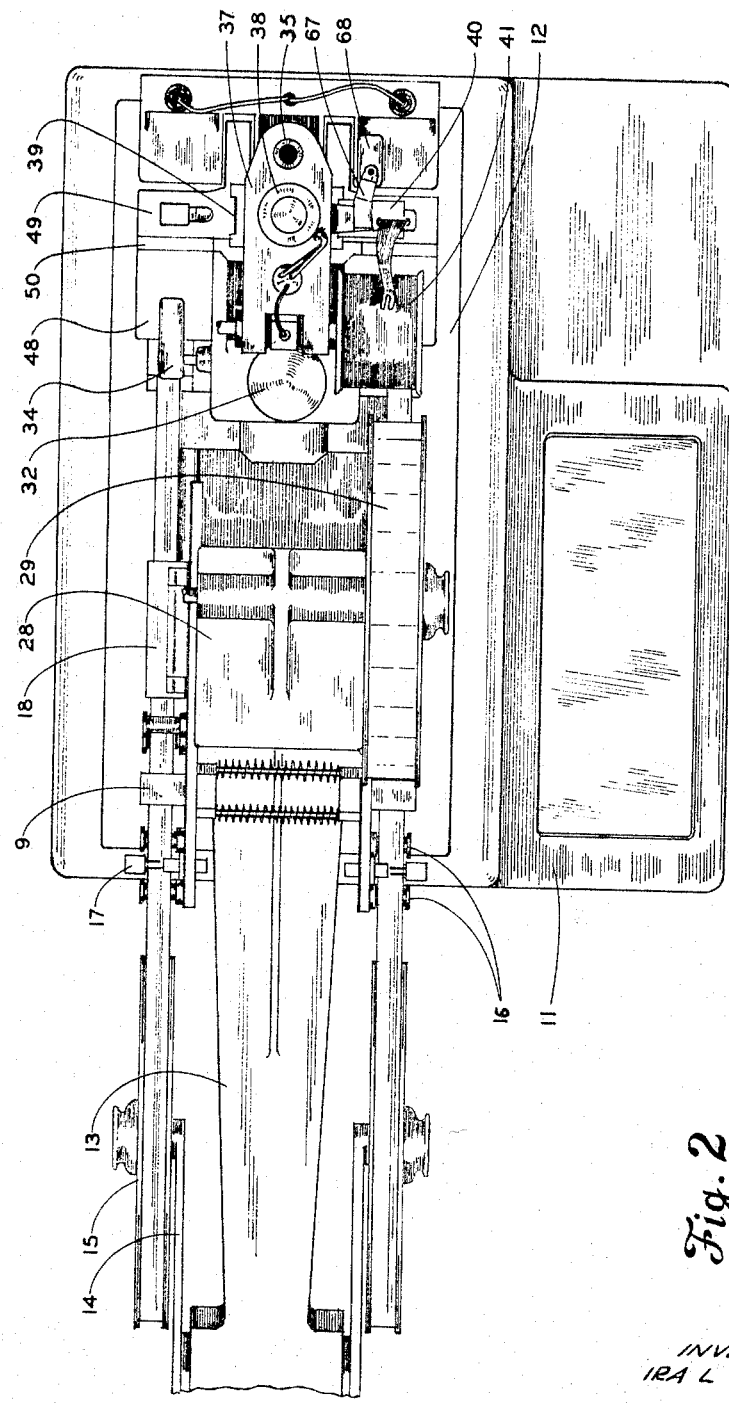
Figure 3:
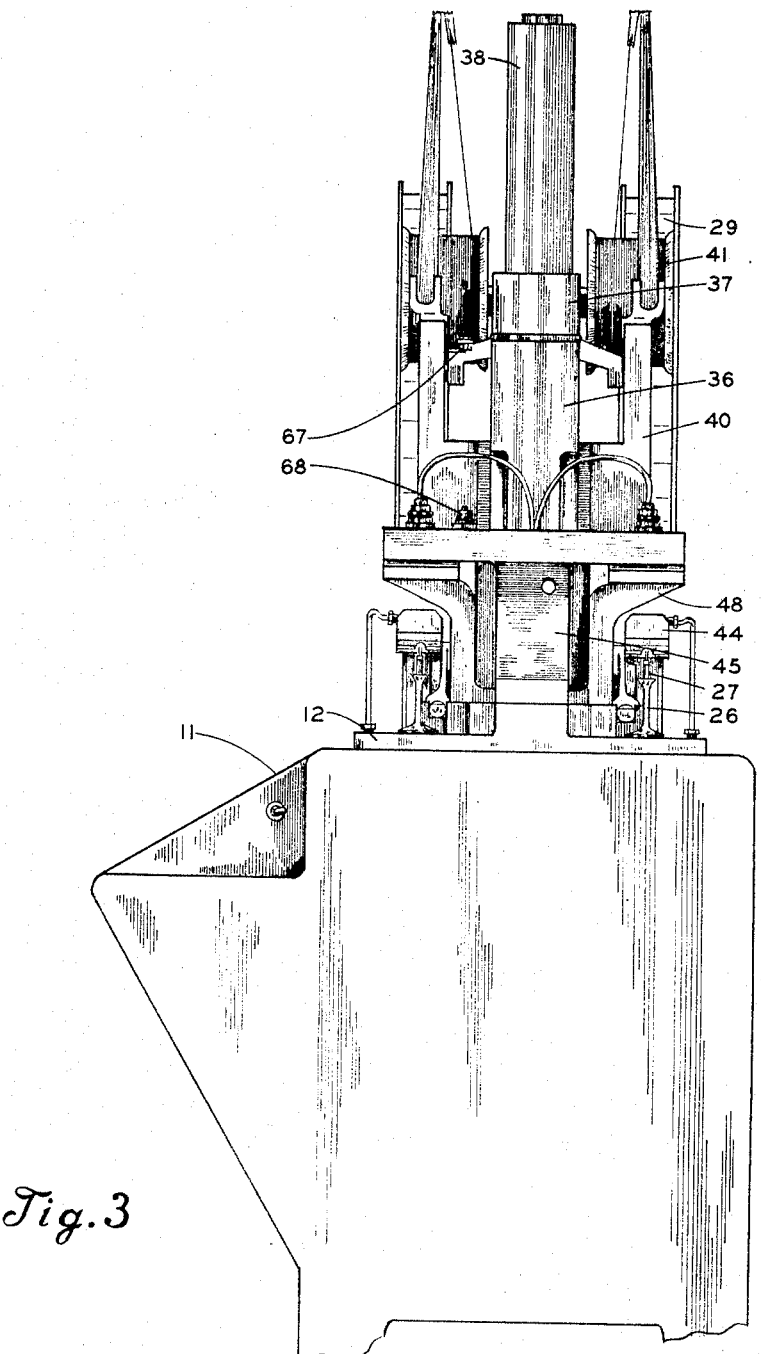
Figure 7:
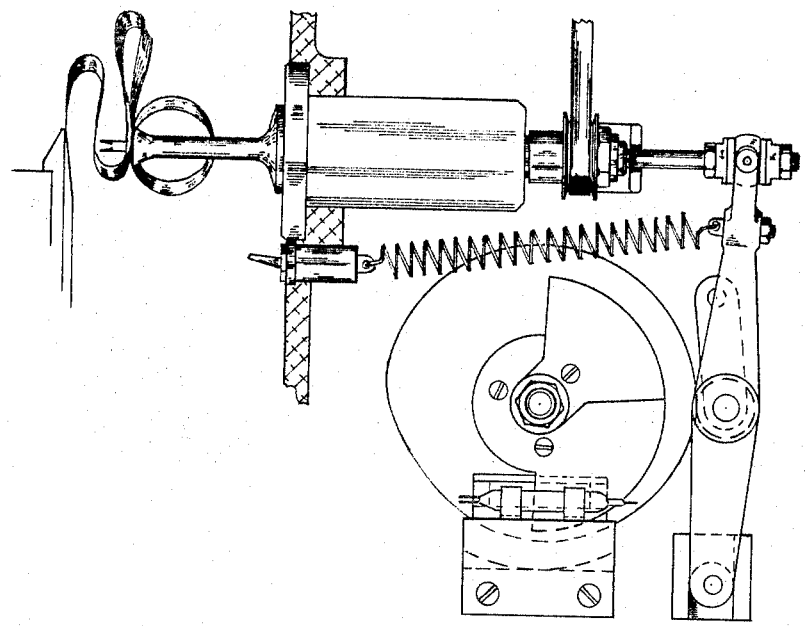
Figure 6:
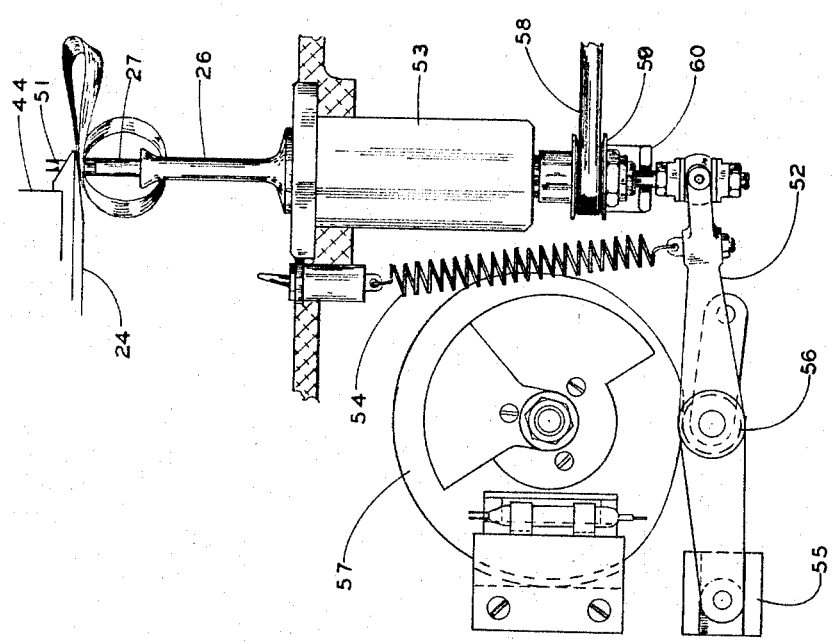
Figure 10:
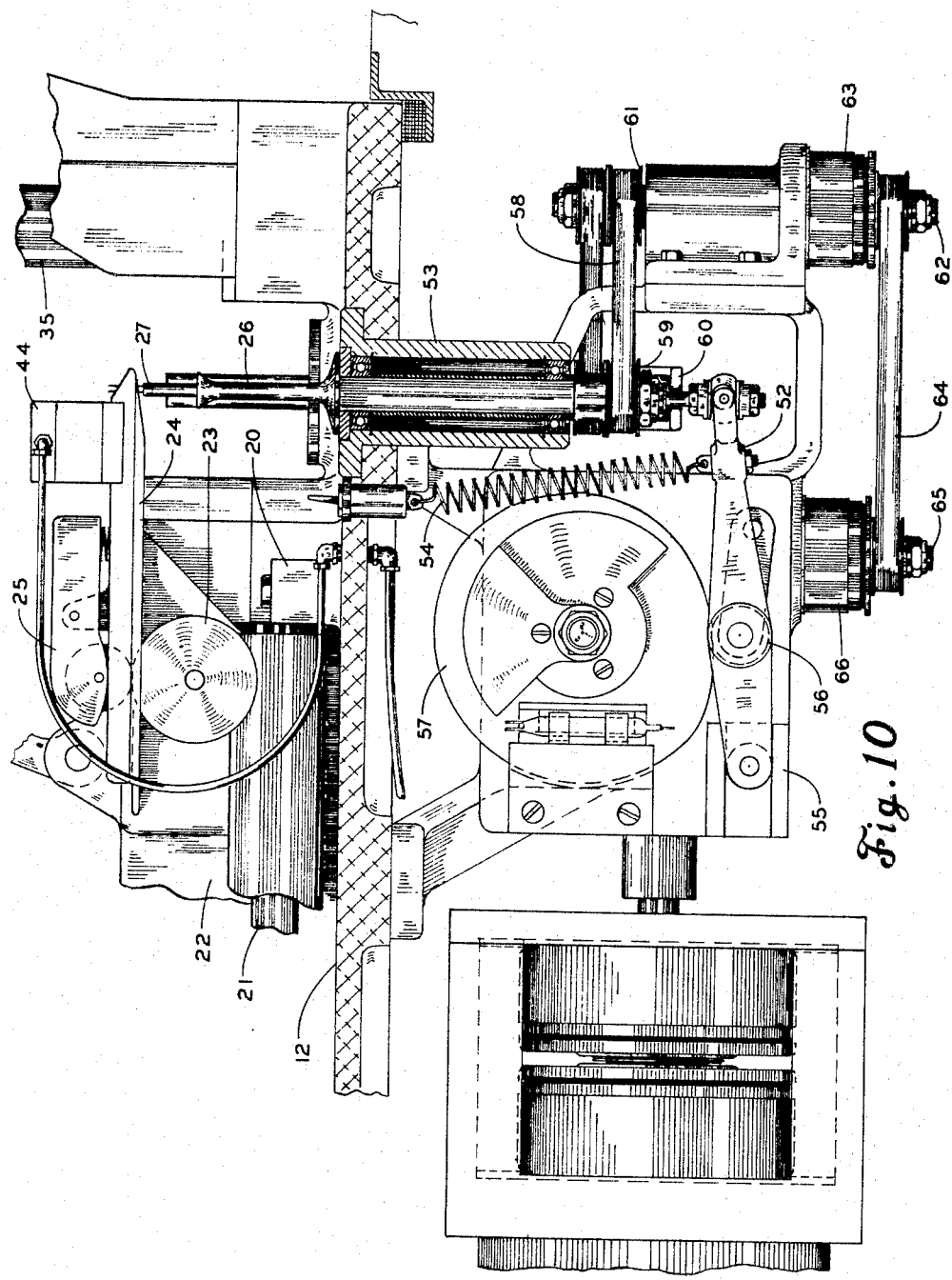
Figure 11:
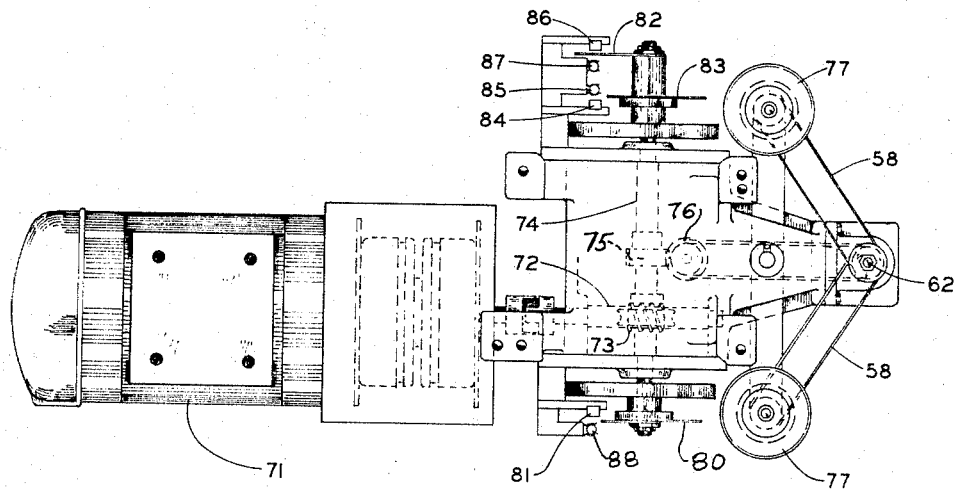
Figure 12:
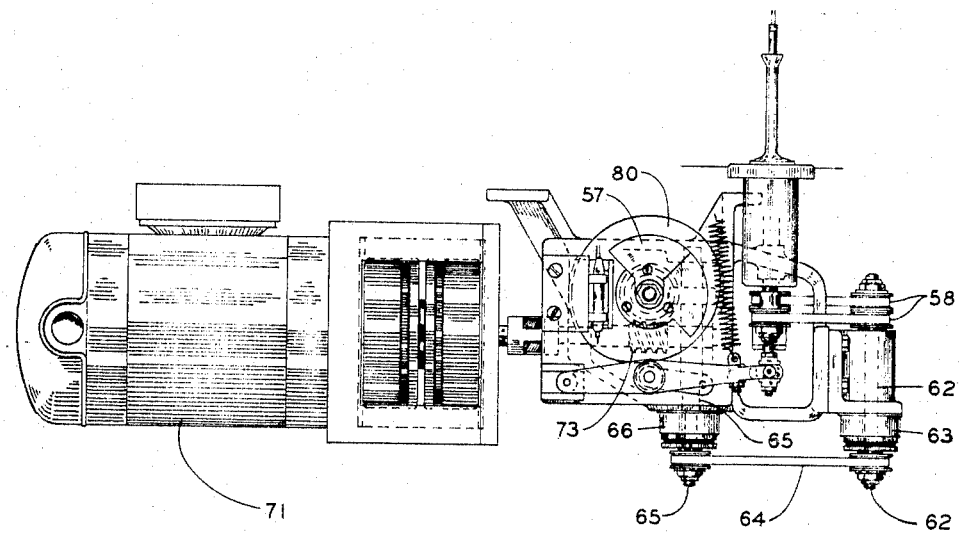
Figure 13:
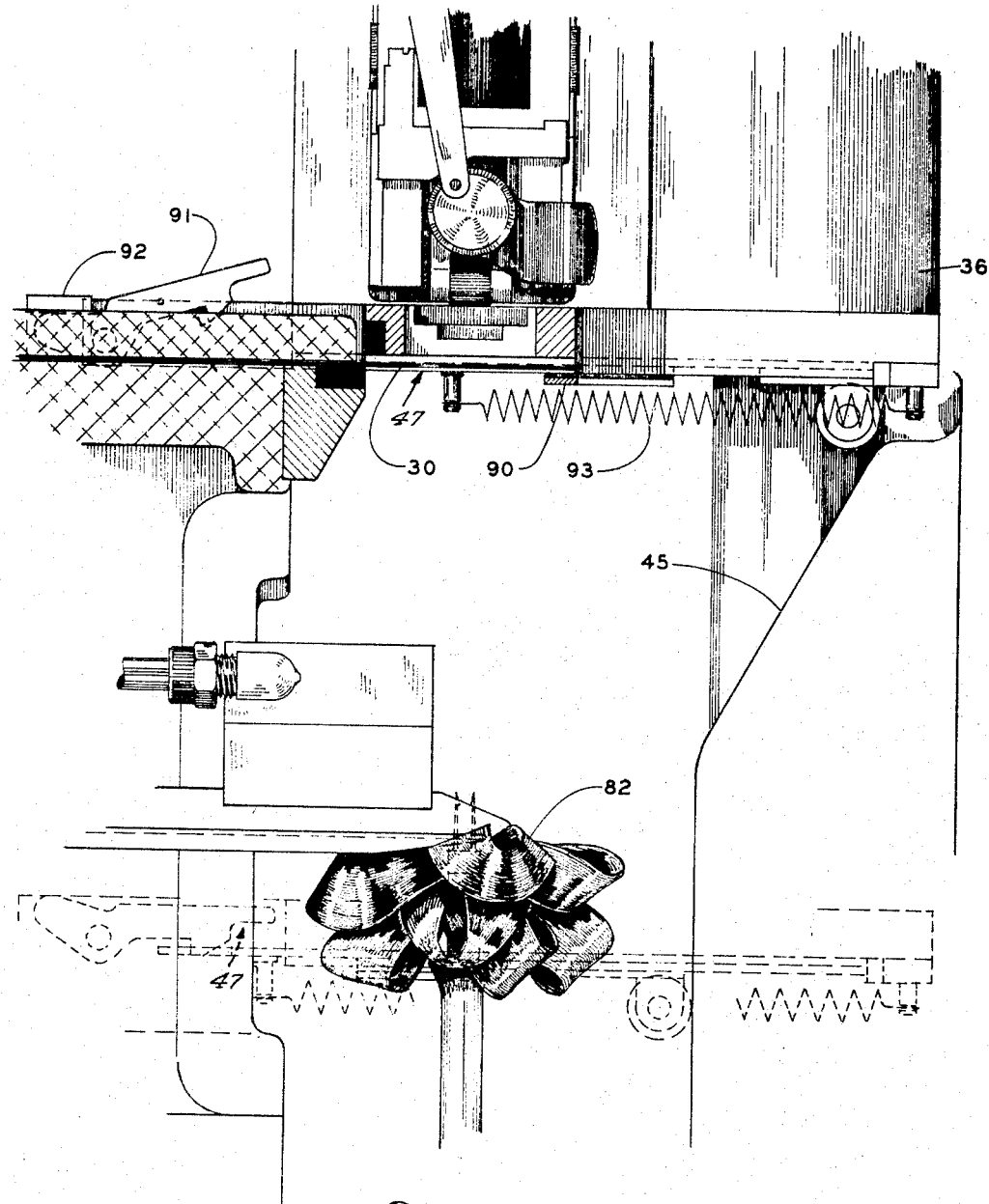

These objects and advantages as well as other objects and advantages may be attained by the device shown by way of illustration in the drawings in which:

FIGURE 1 is a side elevational view of the apparatus for making looped ribbon ornaments, FIGURE 2 is a top plan view thereof, FIGURE 3 is a discharge-end elevational view of the apparatus, FIGURE 4 is a partial side elevational view of the apparatus with the ribbon guide positioned over the spindle, FIGURE 5 is a partial side elevational view of the apparatus with the ribbon guide retracted to give access for the stitcher to the anvil, FIGURE 6 is a side elevational view of the spindle drive assembly in elevated position showing the formation of an initial 360° starting loop and a first 225° bow loop, FIGURE 7 is a partial side elevational view of the spindle drive assembly with the spindle, retracted from the ribbon guide, in the act of twisting to form a third loop, FIGURE 8 is a partial side elevational view of the spindle drive assembly showing the spindle completing rotation of 225° for the formation of the third loop, and rising to pierce the ribbon preparatory to retracting to form a fourth loop, FIGURE 9 is a partial side elevational view of the spindle drive assembly, showing the spindle completely retracted into the anvil to permit the stitcher head to descend to the anvil to attach the card to the completed looped ribbon ornament, FIGURE 10 is a side elevational view of the spindle drive assembly, FIGURE 11 is a top plan view of the transmission and power train immediately under the base plate, FIGURE 12 is a right side elevational view of the transmission and power train, and FIGURE 13 is a view of the ejector assembly.

The subject invention represents a revised construction of the invention shown in copending application No. 475,473 filed on July 28, 1965.

It is known that looped ribbon ornaments can be manufactured by an apparatus which feeds ribbon intermittently to an impaling station, the ribbon is seized, impaled and twisted while the ribbon feed is reciprocated to deliver another length of ribbon to the impaling station. The continuous reciprocation of the ribbon feeding apparatus can only proceed at a limited rate of speed; production is slow; a complex ribbon delivery cycle is utilized with incidental complexity of the apparatus. The cycle utilized is a feed stroke, followed by a retraction stroke, and a successive feed stroke for the ribbon. During the retraction of the ribbon feed, the ribbon is necessarily seized so that it will not be pulled away from the impaling station, and and 3 generally illustrate the apparatus. These figures show a pedestal or cabinet 11 upon which a base plate 12 is mounted.

It has been found that the looped ribbon ornaments can be made by impaling and twisting the ribbon without any pause in the delivery of the ribbon to the impaling station. Thus, in the present apparatus and method, the ribbon is not intermittently fed to the impaling station as has been the practice in the past, but it is continuously fed without pause to the impaling station, where it is impaled and twisted into loops by a vertically reciprocating impalement device, without interfering with the continuously operating feed rate of the ribbon.

The apparatus shown in the drawings represents a preferred example of the invention. The FIGURES 1, 2 and 3 generally illustrate the apparatus. These figures show a pedestal or cabinet 11 upon which a base plate 12 is mounted.

Ribbon supply

Mounted on the base plate 12, and extending rearwardly beyond the base plate, there is a ribbon reel support bracket 13. Attached to the ribbon reel support bracket 13, there is a ribbon reel support arm 14. A ribbon reel 15 is rotatably mounted on the arm 14. A pair of spaced apart ribbon guide spools 16 are mounted on the base plate 12 with a photo cell 17 in between them. This photo cell 17 senses a break in the ribbon or an empty reel and initiates the feeding of ribbon from a stand-by ribbon reel (not shown). The reel 15 is in a vertical plane so it is not necessary to twist the ribbon as it is fed to an impaling station hereinafter referred to. The end of a ribbon from a stand-by spool is held in a vacuum ribbon holder 18. The end of the stand-by ribbon has a pressure sensitive adhesive applied thereto. Beneath the holder, there is a splicer 19 which, when activated by the photo cell 17, chatters and momentarily presses the ribbon to adhere to the adhesive end of the stand-by ribbon 10. The ribbon cutter 9 severs the end of the ribbon being fed from the hub of the exhausted reel 15.

Ribbon guide

Beyond the splicer 19, the base plate 12 carries rail supports 20, upon which rails 21 are mounted. A ribbon guide 22 is slidably mounted on the rails 21. The ribbon passes onto a ribbon support plate 24. It moves between the ribbon drive wheel 23 and the idler 25. It is thereby moved over the outer end of the ribbon support plate 24 to an impaling station. An anvil is mounted on the base plate 12 at the impaling station. An impaling spindle 27 passes through the anvil.

Card mounting

Provision is made for mounting the looped ribbon ornament on a label made of card stock. A card reel support 28 is mounted on the base plate 12. A card reel 29 is carried on the support. Card stock 30 is fed through a card guide 31. A card feed motor 32 periodically actuated, drives a wheel 33. An idler 34 presses the card strip 30 to the drive wheel 33.

Wire stapler

Wire staples are formed to pin the ribbon ornament to the card stock. Vertical slide post 35 is mounted on the base plate. Vertical slide 36 is mounted on the post 35. At the top of the vertical slide post 35, a main air cylinder support 37 is mounted. The main air cylinder 38 drives the vertical slide. A stitcher mounting plate 39 is attached to the vertical slide 36. A stitcher 40 is mounted on the plate 39. A reel 41 containing wire supplies wire to the stitcher 40. The vertical slide 36 is connected to the ribbon guide 22 by a pivotable link 42, as shown in FIGURE 4, in which the vertical slide 36 is in raised position. When the main cylinder 38 drives the vertical slide 36 down to the position shown in FIGURE 5, the link 42 moves the ribbon guide 22 out of the way of the stitcher. The card 30 can then be stitched to the looped ribbon ornament 43 on the anvil 26. When the ribbon guide 22 has been moved away from the spindle 27 after an ornament is completely formed, the drive 23 is momentarily stopped to cease feeding ribbon toward the spindle. A ribbon cutter 44 then cuts the ribbon closely adjacent to the point of impalement. A bow ejector cam 45 is engaged by a cam followed 46, to actuate the bow ejector 47.

Card supply

As has already been noted, the card stock 30 in a continuous strip is fed under a card guide 31 and a card feed support 48 to the edge of a card cut-off die block 50, where it is severed by the card cut-off plate 49 mounted on the vertical slide 36, as the slide descends.

Impaling spindle

As the ribbon is fed at a constant speed over the ribbon guide 24 to the impaling station, the spindle 27 rises and piercing needles 51 impale the ribbon (see FIGURE 6). The height of the spindle 27 is governed by the arm 52. The spindle 27 is slidably mounted in a cartridge 53. A spring 54 normally urges the spindle to the raised position shown in FIGURE 6 where the piercing needles 51 pick up the ribbon. The arm 52 is pivotably mounted on the pivot 55. It carries a cam follower 56 which rides the cam 57 to lower the spindle 27 to a point below the impaling station as shown in FIGURE 7. With the needles 51 on the spindle 27 lowered out of the way of the feeding ribbon, the continuously fed ribbon is twisted by the rotation of the needles and a loop is formed; the rotating cam 57 allows the spindle 27 to rise and impale the next loop on the needles 51. The rotating cam 57 is dimensioned to raise the spindle to impale the ribbon at every 225° rotation. The initial loop (as shown in FIGURE 6) however, is the result of a 360° rotation. The spindle is rotated by a belt 58 running a spindle drive pulley 59. The ordinary retraction of the spindle 27 during impaling and twisting is augmented by a full retraction of the spindle 27 and needles into the anvil 26 at the time when the stitcher head 40 descends. This is accomplished by the spindle retract bar 60, which depresses the arm 52 below the point to which it is ordinarily moved by the cam 57. The bar 60 (see FIGURE 9) in this manner clears the anvil 26. The bar 60 is attached to the vertical slide 36 so that with each descent of the stitcher head 40 to the anvil 26 to attach the label (card) 30, the needles 51 are sheathed in the anvil and protected from damage, thereafter to be extended for further impaling and twisting.

The belt 58 is connected to a spindle drive pulley 61 mounted on the shaft 62. A brake 63 stops the drive shaft when the stitcher 40 operates. The shaft 62 is connected by a drive belt 64 to another drive shaft 65. A clutch 66 similarly disengages the shaft 65 at the same time that the brake 63 is actuated. At each raising of the spindle 27 for the needles 51 to impale the ribbon, the brake 63 and clutch 62 are simultaneously operated, so that the needles 51 rotate as the ribbon 10 is impaled.

The bar 60 carries a lug 67, that descends to engage a head return switch 68. The switch 68 reverses the main air cylinder 38 to return the vertical slide 36 to starting position as shown in FIGURE 1.

The drive and operation

The apparatus is powered by a main motor 71 (FIGURES 11, 12) which drives a horizontally disposed worm shaft 72. The shaft 72 engages a worm gear 73 mounted on a transverse, transfer shaft 74. A transfer gear 75 on the shaft 74 engages a gear 76 on the vertical shaft 65 (see FIGURES 11, 12, 10); the belt 64 drives the shaft 62 from which the belts 58 drives the spindle assemblies 77.

In addition to powering the spindle assemblies 77, the transfer shaft 74 carries the cam 57 upon which the cam follower 56 rides (FIGURES 6, 7, 8, 9); the impaling spindle 27 is raised and lowered thereby in order to perform its impaling function.

Synchronization, regulation and operation of the spindle 27 are controlled by mercury wetted reed-type magnetic electric switches. At one outer end or the shaft 74, a shield 80 is mounted. A magnet 81 is positioned to have its magnetic lines of force intercepted by the shield 80 during part of its revolution. The shield 80 subtends an angle sufficient to pulse the switch 88, that controls the electromagnetic clutch 66 and the brake 63, after each 225° of rotation of the spindle 27; it stops the rotation of the spindle 27, whereupon the cam 57, in synchronism, raises the spindle 27 to impale the ribbon and lowers the spindle 27 to the next 225° twist of the ribbon impaled on the spindle. The synchronous shield 80 now moves to permit engagement of the clutch 66 and disengagement of the brake 63. Since the cam 57 and the shield 80 are on the same shaft, the synchronization of the impaling function (mechanically controlled) and the twisting function (electrically controlled) is unvaryingly perfect despite increases or decreases in speed of operation. The impaling and twisting continues alternately until a complete ornament 82 (see FIGURE 9) is formed.

A more satisfactory looped ribbon ornament is formed when the first loop is the result of a 360° twist of the spindle 27, as this produces a center fill-in. After the first impalement, the counter controlled by a counter shield 82 momentarily completes a circuit connecting a 360° shield 83 between the magnet 84 and the magnet switch 85. This pulses the clutch 66 and the brake 63 only after the spindle has completed a 360° rotation so that a center 360° loop for the ornament is formed (see FIGURE 6). The next successive 225° impalement is shown also in FIGURE 6, and the following impalement in FIGURES 7 and 8 with the final impalement in FIGURE 9. The counter shield 82 intercepts the magnetic field of the magnet 86, so that it acts on a magnetic switch 87 which activates a counter of conventional design. When the counter reaches a setting which determines the preselected number of loops in the ornament, it opens the circuit to the ribbon feed motor which stops the ribbon, it momentarily activates the card feed motor 32, it activates the main air cylinder 38; the cylinder lowers the slide 36, which withdraws the spindle 27 into the anvil, at the same time applying the card or label 30 to the back of the ornament while the stitcher 40 pins the ornament 82 to the card 30. The ribbon cutter 44 has also been pulsed by the counter when it reaches its set limit predetermined number of loops in the ornament 82, and the tail end of the ribbon is cut free from the ribbon reel.

*Ejector assembly*

To remove the ornament 82 from the apparatus, a spring loaded ejector 90 is slidably mounted on the vertical slide 36. A bow ejector cam 45 is provided so that the cam follower moves the ejector 90 rearwardly to pick up the card 30. When the ejector has reached the limit of its rearward movement, the ejector 90 engages a latch 91 which holds it until the affixation of the ornament 82 to the card 30 is complete; when the slide 36 rises, a latch release 92 is engaged and the spring 93 urges the ejector 90 forward to discharge the ornament 82.

*Operation*

The operation of the apparatus is as follows. The motor operating the ribbon drive 23 is energized and the ribbon commences to feed toward the impaling station at the outer end of the ribbon guide 24. The main drive motor is also energized and the cam 57 is rotated. The spindle 27 moves into the impaling station causing the piercing needles 51 to impale the ribbon and the spindle is withdrawn.

The clutch 66 (which has been disengaged) is engaged, and the brake 63 is released, thereby causing rotation of the spindle to form a loop, upon completion of which the spindle 27, moved by the cam 57, moves again to impale the ribbon and the cycle is repeated. During the impalement, the clutch 66 is disengaged and brake 63 is engaged.

The initial degree of rotation of the spindle and the subsequent degree of rotation of the spindle is controlled by the cooperation of the shield 80, the magnet 81 and the mercury switch 88. Loops formed normally are the result of a 225° rotation of the spindle, permitted by the shield 80. For the initial loop, the shield 83 in cooperation with the magnet 84 and the mercury switch 85 permits an additional 135° rotation of the spindle for a total of 360°. The shield 82 in cooperation with the magnet 86 and the mercury switch 87 activate a conventional counter which may be set to limit the total number of loops in each looped ribbon ornament formed. The counter also opens the circuit to the mercury switch 87 after the second impalement, thereby permitting a first 360° loop but only 225° loops thereafter. A switch may be provided to defeat the magnetic switch 85, if it is desired that the first loop shall merely be a 225° loop. When the pulsing of the counter by the mercury switch 87 reaches a preselected setting, the end of the looped ribbon ornament cycle is accomplished by the counter which opens the drive circuit, stopping the twisting and impaling, stopping the feeding of the ribbon, pulses the ribbon cutter to cut the ribbon, and activates the main air cylinder, thereby activating the vertical slide 36, whereby the card 30 is cut at the impaling station, the stitcher 40 attaches the ornament to the card and the ejector discharges the mounted looped ribbon ornament 82. The lug 67 engages the head return switch 68, returning the head to its initial position. The cycle recommences. The counter and the control circuit are conventional and are no part of the present invention. They are, therefore, not shown in detail.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:
1. An apparatus for making looped ribbon ornaments comprising,
    (a) a spindle for impaling and twisting a ribbon into loops,
    (b) a ribbon guide for holding a ribbon for impalement by the spindle, wherein the improvement comprises,
    (c) a means to feed ribbon to the impaling spindle continuously during impaling and twisting.
2. The device according to claim 1 and,
    (a) a means to raise the spindle to impale a ribbon, lower the spindle with the ribbon impaled, rotate the spindle to form a ribbon loop, raise the spindle to impale the ribbon again,
    (b) a slidable mounting for the ribbon guide,
    (c) a slidable mounting for a ribbon securing means,
    (d) a connection between the ribbon guide and the slidable mounting for the ribbon securing means whereby the ribbon guide is shunted aside out of the way of a ribbon securing means by the slidable mounting.
3. The device according to claim 2 comprising,
    (a) a spring loaded ejector on the slidable mounting for the ribbon securing means,
    (b) a latch for holding the ejector under spring tension,
    (c) a cam surface adjacent to the slidable mounting for the ribbon securing means engageable with the ejector to move it into locking engagement with the latch when the slidable mounting for the ribbon securing means descends,
    (d) a latch release to disengage with the latch when the slidable mounting for the ribbon securing means ascends.
4. The device according to claim 1 and,
    (a) a slidable mounting for a ribbon securing means,
    (b) a spindle retractor engaged by the slidable mounting,
    (c) an anvil with a central bore into which the spindle is retracted when the slidable mounting descends.
5. A method for forming looped ribbon ornaments comprising,
    (a) feeding the ribbon,
    (b) impaling the ribbon,
    (c) twisting the ribbon into a first loop,
    (d) impaling the ribbon at the end of the first loop,
    (e) successively twisting the ribbon into additional loops,
    (f) impaling the ribbon after each loop, wherein the improvement comprises,
    (g) continuously feeding the ribbon without pause during the steps of impaling and twisting.
6. The device according to claim 1 and,
    (a) a magnet, a magnet shield, and a magnetic electro-switch cooperatively positioned with respect to each other,
    (b) the electroswitch connected to control a brake and a clutch for a spindle drive means for rotating the spindle,
    (c) a cam, a cam follower, and a spindle drive connected to the cam for raising and lowering the spindle,
    (d) a driven common shaft mounting for the cam and the magnetic shield whereby the brake and clutch are operated in synchronism with the raising and lowering of the spindle, to stop the rotation of the spindle when the cam raises the spindle and to rotate the spindle when the cam lowers the spindle.
7. A method for forming looped ribbon ornaments comprising
    (a) continuously feeding a ribbon to an impaling station,
    (b) advancing an impaling spindle to impale the continuously feeding ribbon at the impaling station,

(c) reciprocating and twisting the impaling spindle as the ribbon feeds continuously to the impaling station, to twist the ribbon into a loop and to reimpale the ribbon at the end of the loop, (d) securing together the loops of ribbon.

8. An apparatus for forming looped ribbon ornaments comprising (a) means to deliver continuously to an impaling station, successive portions of ribbon spaced along the continuous length thereof, (b) means to impale the moving ribbon, which means has needles at the end thereof, (c) the means to impale mounted for reciprocation to and away from the impaling station to engage the successive portions of the moving ribbon on the needles thereat and to retain the portions in fixed position on the needles, and rotatably therewith, (d) the means-to-impale also mounted for rotation, (e) means to drive the means to deliver continuously to feed the ribbon without pause during the impaling and twisting of the successive portions of the ribbon, (f) means to drive the means-to-impale to reciprocate to impale the successive portions of the ribbon, (g) means to drive the means-to-impale to rotate while reciprocating away from and toward the impaling station, to twist the length of ribbon after each impaled portion into a loop prior to the successive portion of the ribbon being impaled on the needles.

9. An apparatus for forming looped ribbon ornaments according to claim 1 in which the means to feed the ribbon continuously is a pair of rollers with the ribbon engaged between them.

10. An apparatus for forming looped ribbon ornaments according to claim 8 in which the means to feed the ribbon without pause is a pair of rollers with the ribbon engaged between them.

References Cited

UNITED STATES PATENTS

| 2,933,223 | 4/1960 | Kravig et al. | 223—46 |
| 3,223,299 | 12/1965 | Kerrigan | 223—46 |
| 3,229,869 | 1/1966 | Thayer | 223—46 |
| 3,249,269 | 5/1966 | Bock | 223—46 |
| 3,291,352 | 12/1966 | Grikis | 223—46 |

JORDAN FRANKLIN, *Primary Examiner.*

G. V. LARKIN, *Assistant Examiner.*

U.S. Cl. X.R.

28—15, 2